(12) United States Patent
Ghate et al.

(10) Patent No.: US 12,489,783 B2
(45) Date of Patent: Dec. 2, 2025

(54) INTRUSION DETECTION AND REMEDIATION BASED ON TYPE OF INTRUSION

(71) Applicant: Dell Products L.P., Round Rock, TX (US)

(72) Inventors: Trupti Ghate, Pune (IN); Piyush Tibrewal, Pune (IN)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 18/355,625

(22) Filed: Jul. 20, 2023

(65) Prior Publication Data

US 2025/0030728 A1 Jan. 23, 2025

(51) Int. Cl.
*H04L 9/40* (2022.01)

(52) U.S. Cl.
CPC ...... *H04L 63/1441* (2013.01); *H04L 63/1416* (2013.01); *H04L 63/20* (2013.01)

(58) Field of Classification Search
None
See application file for complete search history.

(56) References Cited

U.S. PATENT DOCUMENTS

| 9,100,431 | B2 * | 8/2015 | Oliphant | H04L 63/1433 |
| 10,609,063 | B1 * | 3/2020 | Oliphant | G06F 21/50 |
| 2017/0279844 | A1 * | 9/2017 | Bower, III | H04L 63/1425 |
| 2018/0121649 | A1 * | 5/2018 | Folco | G06F 21/568 |
| 2018/0248893 | A1 * | 8/2018 | Israel | H04L 63/1433 |
| 2019/0347155 | A1 * | 11/2019 | Chevalier | G06F 11/0778 |
| 2020/0162503 | A1 * | 5/2020 | Shurtleff | H04L 41/0894 |
| 2021/0026947 | A1 * | 1/2021 | Korotaev | G06F 9/4856 |
| 2021/0216408 | A1 * | 7/2021 | Huskisson | G06F 3/0653 |
| 2022/0360594 | A1 * | 11/2022 | Cosgrove | H04L 63/1416 |

* cited by examiner

*Primary Examiner* — Joseph P Hirl
*Assistant Examiner* — Hassan Saadoun
(74) *Attorney, Agent, or Firm* — DALY, CROWLEY, MOFFORD & DURKEE, LLP (57) ABSTRACT

An example methodology includes, by a computing device, preparing remediation materials for use in remediating an intrusion on a resource of a computing system, monitoring the resource for intrusions, and detecting an intrusion on the resource based on the monitoring. The method also includes, responsive to a determination that the intrusion on the resource is an illegitimate intrusion, by the computing device, identifying at least one rule to execute to remediate the intrusion on the resource and running the identified at least one rule to remediate the intrusion on the resource, wherein the at least one rule defines one or more actions to sanitize the resource based on the remediation materials.

20 Claims, 5 Drawing Sheets

INTRUSION DETECTION AND REMEDIATION BASED ON TYPE OF INTRUSION

BACKGROUND

A storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

Distributed storage systems, along with other types of distributed computing systems, may be hosted within cloud computing environments and/or on-premises data centers. A distributed computing system can include various types of hardware and software components. Hardware components can include physical and/or virtual machines, storage devices, networking hardware, etc. Software components can include virtualization software, operating systems (OSs), services, middlewares, applications, etc., configured to run on and utilize physical/virtual hardware.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, preparing remediation materials for use in remediating an intrusion on a resource of a computing system, monitoring the resource for intrusions, and detecting an intrusion on the resource based on the monitoring. The method also includes, responsive to a determination that the intrusion on the resource is an illegitimate intrusion, by the computing device, identifying at least one rule to execute to remediate the intrusion on the resource and running the identified at least one rule to remediate the intrusion on the resource, wherein the at least one rule defines one or more actions to sanitize the resource based on the remediation materials.

In some embodiments, the remediation materials include an original copy of the resource necessary to sanitize the resource to its original state.

In some embodiments, the remediation materials include original copies of components of the resource necessary to sanitize a component of the resource to its original state.

In some embodiments, the preparing of the remediation materials is in a controlled environment.

In some embodiments, the at least one rule defines one or more actions to sanitize beyond the resource.

In some embodiments, the resource is an operating system (OS)-level component, and wherein the at least one rule defines one or more actions to sanitize all or a subset of OS-level components of the computing system.

In some embodiments, the resource is an application-level component, and wherein the at least one rule defines one or more actions to sanitize all or a subset of application-level components of the computing system.

In some embodiments, the resource is a storage-level component, and wherein the at least one rule defines one or more actions to sanitize all or a subset of storage-level components of the computing system.

In some embodiments, the resource is a network-level component, and wherein the at least one rule defines one or more actions to sanitize all or a subset of network-level components of the computing system.

In some embodiments, the resource is a node in a cluster, and wherein the at least one rule defines one or more actions to sanitize all or a subset of nodes in the cluster.

In some embodiments, the resource is a configuration file of a service, and wherein the at least one rule defines one or more actions to sanitize the service.

According to another illustrative embodiment provided to illustrate the broader concepts described herein, a computing device includes one or more non-transitory machine-readable mediums configured to store instructions and one or more processors configured to execute the instructions stored on the one or more non-transitory machine-readable mediums. Execution of the instructions causes the one or more processors to carry out a process including preparing remediation materials for use in remediating an intrusion on a resource of a computing system and monitoring the resource for intrusions. The process also includes detecting an intrusion on the resource based on the monitoring and, responsive to a determination that the intrusion on the resource is an illegitimate intrusion, running at least one rule to remediate the intrusion on the resource, wherein the at least one rule defines one or more actions to sanitize the resource based on the remediation materials.

According to another illustrative embodiment provided to illustrate the broader concepts described herein, a non-transitory machine-readable medium encodes instructions that when executed by one or more processors cause a process to be carried out, the process including preparing remediation materials for use in remediating an intrusion on a resource of a computing system and monitoring the resource for intrusions. The process also includes detecting an intrusion on the resource based on the monitoring and, responsive to a determination that the intrusion on the resource is an illegitimate intrusion, running at least one rule to remediate the intrusion on the resource, wherein the at least one rule defines one or more actions to sanitize the resource based on the remediation materials.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Storage systems may be vulnerable to attacks by malicious actors. For example, a malicious actor may gain unauthorized access to a resource or resources of a storage system. Once an intruder gains unauthorized access, depending on the level of unauthorized access, the intruder can perform activities such as changing configuration files, updating permissions, and replacing or modifying binaries, which result in data breach of the storage system. Conventional techniques for combating such unauthorized accesses and other types of intrusions can be problematic in that, other than detecting and alerting of a detected intrusion, such techniques have no knowledge or capability to investigate and remediate the intrusion. It is left to the user of the system receiving the alert (e.g., a security operations center analyst or incident responder) to investigate the intrusion and take the appropriate actions to remediate the threat. Using such techniques may leave the system vulnerable for an unduly long amount of time.

Disclosed herein are concepts, structures, and techniques for automated detection and remediation of intrusions on computing systems. In some embodiments, a system, such as a storage system, may be monitored for intrusions and, upon detection of an intrusion, a determination can be made as to whether the detected intrusion is an illegitimate (or "undesired") intrusion. In response to determining that an illegitimate intrusion is detected, one or more predetermined actions may be triggered to remediate the undesired intrusion. The remediation may be performed in a manner as to significantly reduce, and ideally eliminate, the duration the system may be in a vulnerable state due to the illegitimate intrusion. In some embodiments, the remediation of an illegitimate intrusion may be based on the type or degree of intrusion that is detected. In some embodiments, the remediation of an illegitimate intrusion is based on the capabilities provided by the underlying system. In any case, the remediation can be performed in a manner that is transparent to clients of the system, thus providing high availability (HA) characteristics. Numerous configurations and variations will be apparent in light of this disclosure.

Figure 1:
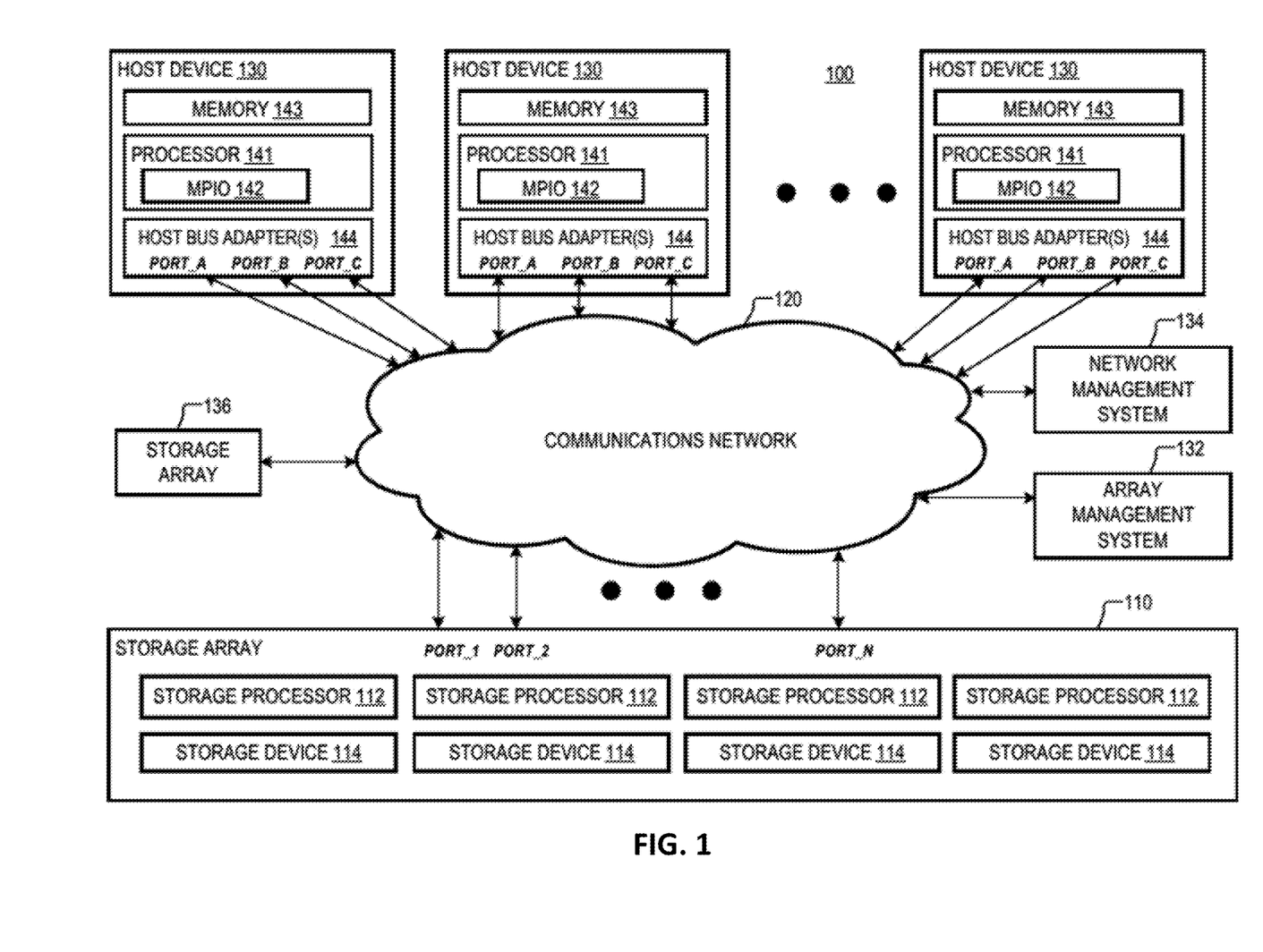
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 600 of FIG. 6. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath TM drivers from Dell EMC TM, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 5:
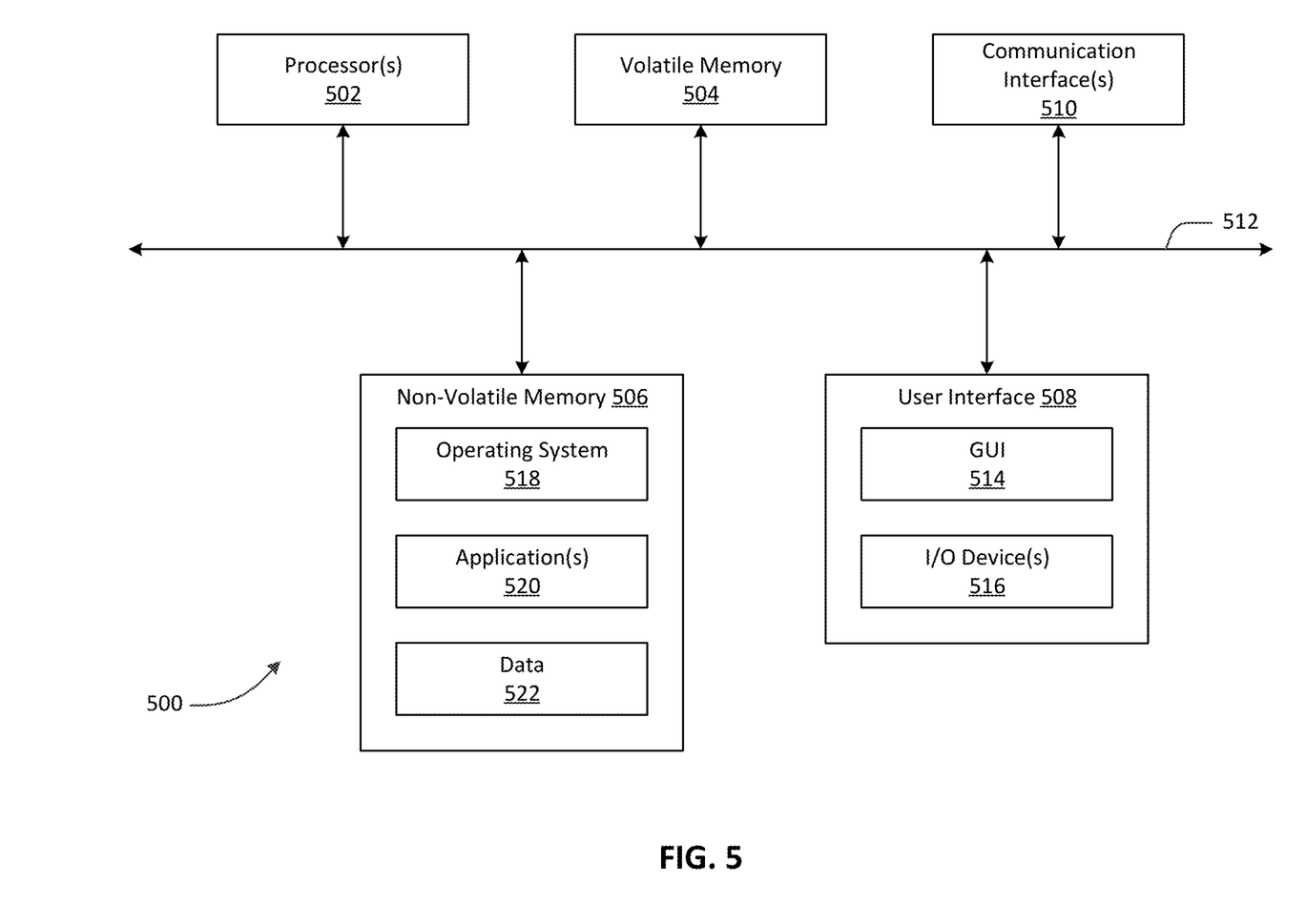
FIG. 5 is a block diagram illustrating selective components of an example computing device in which various aspects of the disclosure may be implemented, in accordance with an embodiment of the present disclosure.

Array management system 132 may include a computing device, such as computing device 500 of FIG. 5. Array management system 132 may be used by a system administrator to re-configure storage array 110, e.g., when degraded performance of storage array 110 is detected.

Network management system 134 may include a computing device, such as computing device 500 of FIG. 5. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration. a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
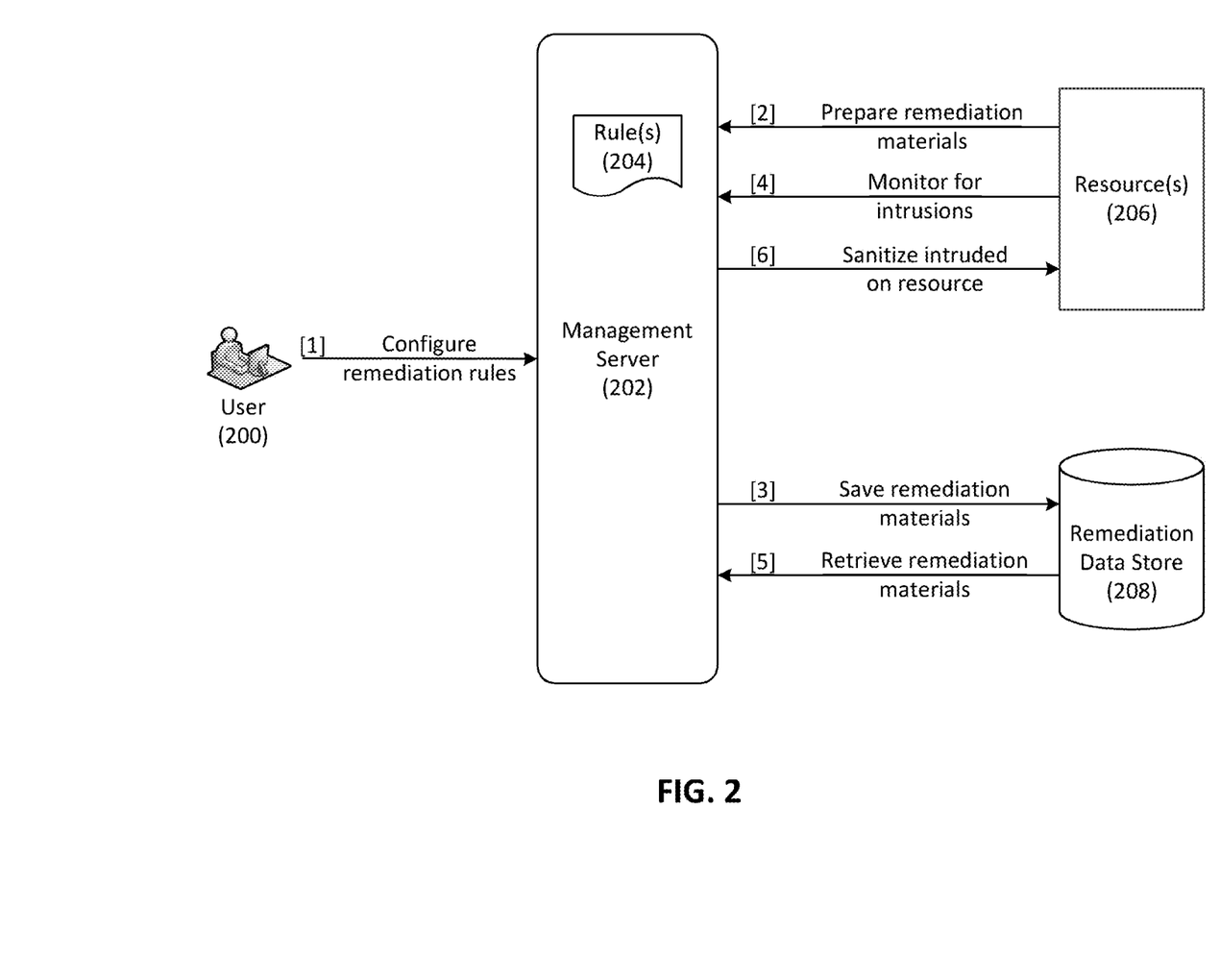
FIG. 2 is a schematic illustration of an example intrusion detection and remediation topology that can be used to remediate illegitimate intrusions on computing system resources without disruption to clients, in accordance with an embodiment of the present disclosure.

FIG. 2 is a schematic illustration of an example intrusion detection and remediation topology that can be used to remediate illegitimate intrusions on computing system resources without disruption to clients, in accordance with an embodiment of the present disclosure. Such a topology can be understood as a process in which a user 200 within or associated with an organization leverages the services of a management server 202. For example, user 200 can configure [1] one or more rules 204 that define conditions and actions for remediating intrusions on resources 206. Resources 206 may include computing systems and/or components of computing systems, such as, for example, operating systems (OSs), services, middleware, applications, file binaries, configuration files, and software, to provide several examples. According to one embodiment, management server 202 may provide a software-based tool or user interface (UI), such as a graphical UI, with which user 200 can configure rules 204.

For example, user 200 may configure remediation rules 204 (sometimes referred to herein as "rules 204" or more simply as "rules") based on or with sufficient knowledge of the functionality of the underlying systems/services, such as, for example, storage system 100 of FIG. 1, on which resources 206 are provided or hosted thereby. In other words, user 200 may configure rules 204 based on knowledge of the remediating capabilities of the underlying systems/services. For example, if an underlying system on which a resource is provided provides for failover of a resource, user 200 may configure a rule (e.g., design one or more rules 204) that defines actions to failover the resource, sanitize the resource, and failback the resource to remediate an intrusion on the resource. As another example, if an underlying system provides for remediation of a node in a cluster, such as, for example, a remediate node operator, user 200 may configure a rule that defines actions to trigger the remediate node operator on the node to sanitize (or "cleanse") the node (e.g., sanitize the base OS of the node) to remediate an intrusion on the node and/or cluster. As still another example, if the underlying system provides for remediation of an application (e.g., remediate application code), user 200 may configure a rule that defines actions to sanitize the application by, for example, replacing the application or components of the application to remediate an intrusion on the application. In any case, user 200 may configure rules 204 based on knowledge of resources 206 which may be intruded on and need remediation due to intrusions as well as knowledge of the functionality provided by the underlying systems/services.

User 200 may configure rules to determine whether detected intrusions on resources are illegitimate intrusions. When such rules are executed (or "run"), conditions can be evaluated to determine whether the intrusion is an illegitimate intrusion or a legitimate intrusion. The determination of whether an intrusion is an illegitimate intrusion may be based on the state of the underlying system/service on which the intruded-on resource is provided. By way of a simple example, a rule may be configured to determine whether an intrusion on a particular configuration file of a system/service is an illegitimate intrusion. The condition that is evaluated may be to check whether the system/service is in a "service mode" (e.g., a scheduled service procedure is running on the system/service associated with the configuration file). The rule may specify that the intrusion on the configuration file is not an illegitimate intrusion if the condition evaluates to true (i.e., the underlying system/service is in a "service mode") and the intrusion on the configuration file is an illegitimate intrusion if the condition evaluates to false (i.e., the underlying system/service is not in a "service mode"—e.g., system/service is in a "running mode" or "non-service mode").

User 200 may also configure rules that define actions that are to be performed (or "executed") to remediate intrusions on resources. Such rules to remediate intrusions on resources may be executed upon determining that an intrusion on a resource is an illegitimate intrusion. Here, the determination that an intrusion on a resource is an illegitimate intrusion can be understood to be a condition of the rules. In some embodiments, the actions defined to remediate an intrusion on a resource may include operations to sanitize the resource that is intruded on (e.g., sanitize the resource on which the suspicious activity is detected). For example, a rule that can be executed when an illegitimate intrusion on a particular configuration file is detected may define actions (sometimes referred to herein as "operations") to sanitize the configuration file. As another example, a rule that can be executed when an illegitimate intrusion on a particular node in a cluster is detected may define operations to sanitize the node in the cluster.

In some embodiments, the actions defined to remediate an intrusion on a resource may include operations to sanitize beyond the resource, such as a group of resources that includes the resource that is intruded on. For example, a rule that can be executed when an illegitimate intrusion on a particular configuration file of a service is detected may define actions to sanitize the service. As another example, a rule that can be executed when an illegitimate intrusion on a particular network component of a system is detected may define actions to sanitize all or a subset of network components of the system to sanitize the network component (e.g., to remediate the intrusion on the network component). As still another example, a rule that can be executed when an illegitimate intrusion on a particular node in a cluster is detected may define actions to sanitize all or a subset of the nodes in the cluster to sanitize the node (e.g., to remediate the intrusion on the node). As yet another example, a rule that can be executed when an illegitimate intrusion on a particular component of a system is detected may define actions to sanitize all components of the system of the same type or level as the component that is intruded on to sanitize the component (e.g., to remediate the intrusion on the component). Non-limiting examples of types/levels of components in a system include OS-level components, application-level components, storage-level components, authentication and authorization-level components, network-level components, front-end components, and back-end components. By way of an example, a rule that can be executed to remediate an intrusion on a particular OS-level component of a system is detected may define actions to sanitize all OS-level components of the system (e.g., to remediate the intrusion on the particular OS-level component of the system). As another example, a rule that can be executed to remediate an intrusion on a particular forward-looking component of a system is detected may define actions to sanitize all forward-looking components of the system (e.g., to remediate the intrusion on the particular forward-looking component of the system). In any case, the rules may define actions to sanitize a particular resource or types/levels of resources.

Continuing the example of FIG. 2, management server 202 may prepare [2] remediation materials for use in remediating intrusions on resources 206. In particular, according to some embodiments, for a particular resource to be monitored for intrusions, management server 202 can monitor for installation of the resource on a system. Upon detecting the installation of the resource, management server 202 can determine the remediation materials needed to remediate an intrusion on the resource. For example, upon detecting an installation of a cluster, management server 202 may prepare an original copy and/or configuration of the cluster (e.g., the initial full view of the newly installed cluster) as the remediation materials for use in sanitizing the cluster or components of the cluster. For instance, according to one embodiment, during installation of a cluster, such as a file cluster, an alternate partition may be prepared with the base OS and corresponding OS binaries and libraries for use in partition switching in case the cluster or components of the cluster need to be sanitized. As another example, upon detecting an installation of a service on a system, management server 202 may prepare an original copy and/or configuration of the service as the remediation materials for use in sanitizing the cluster or components of the cluster. In any case, for a resource, the remediation materials may include the original copy of the resource and/or copies of components of the resource, such as the OS, application binaries, libraries, configuration files, and/or other files and materials, necessary to sanitize the resource and/or components of the resource to their original states (e.g., original states prior to any intrusion—e.g., their states at the time of installation). In some embodiments, management server 202 may prepare the remediation materials in a controlled environment, meaning that the system/environment on which remediation materials are prepared is standalone and no external communication is allowed.

Management server 202 may then save (e.g., record) the remediation materials for subsequent use in sanitizing resources 206 in case of illegitimate intrusions on resources 206. For example, according to one embodiment, management server 202 can save [3] such remediation materials within a remediation data store 208, where they can be subsequently retrieved and used. In some embodiments, remediation data store 208 may be a secure data store.

Upon preparing the remediation materials for use in remediating intrusions on a resource, management server 202 can monitor [4] the resource (e.g., resource 206) for intrusions. In some embodiments, management server 202 can implement or utilize an intrusion detection technique, such as the Advanced Intrusion Detection Environment (AIDE) or another open source integrity checking utility, to monitor resources 206 for intrusions (e.g., monitor resources 206 for suspicious activities).

During the monitoring of resources 206, management server 202 may detect an intrusion on a particular resource. In response, according to one embodiment, management server 202 may check to determine whether the intrusion on the particular resource is an illegitimate intrusion which needs to be remediated. Management server 202 can leverage rules 204 to determine whether the intrusion on the particular resource is an illegitimate intrusion. For example, management server 202 can identify the rule to execute to determine whether the intrusion on the particular resource is an illegitimate intrusion and run the identified rule. If the determination is that the intrusion on the particular resource is not an illegitimate intrusion, management server 202 may continue monitoring of resources 206. In one embodiment, management server 202 may document the detected intrusion on the particular resource in a log, for example, for subsequent analysis. Otherwise, if the determination is that the intrusion on the particular resource is an illegitimate intrusion, management server 202 can leverage rules 204 to remediate the detected intrusion on the particular resource. For example, management server 202 can identify the rule(s) to execute to remediate the intrusion on the particular resource and run the rule(s) to remediate the intrusion on the particular resource. As shown in FIG. 2, in some embodiments, executing the actions defined by the rule(s) to remediate the intrusion on the particular resource may cause the remediation materials prepared for use in remediating intrusions on the particular resource to be retrieved [5] from remediation data store 208 and used to sanitize [6] the particular resource that is intruded on. In one embodiment, management server 202 may document the detected illegitimate intrusion and/or the sanitization of the intruded on particular resource in a log, for example, for subsequent analysis.

Figure 3:
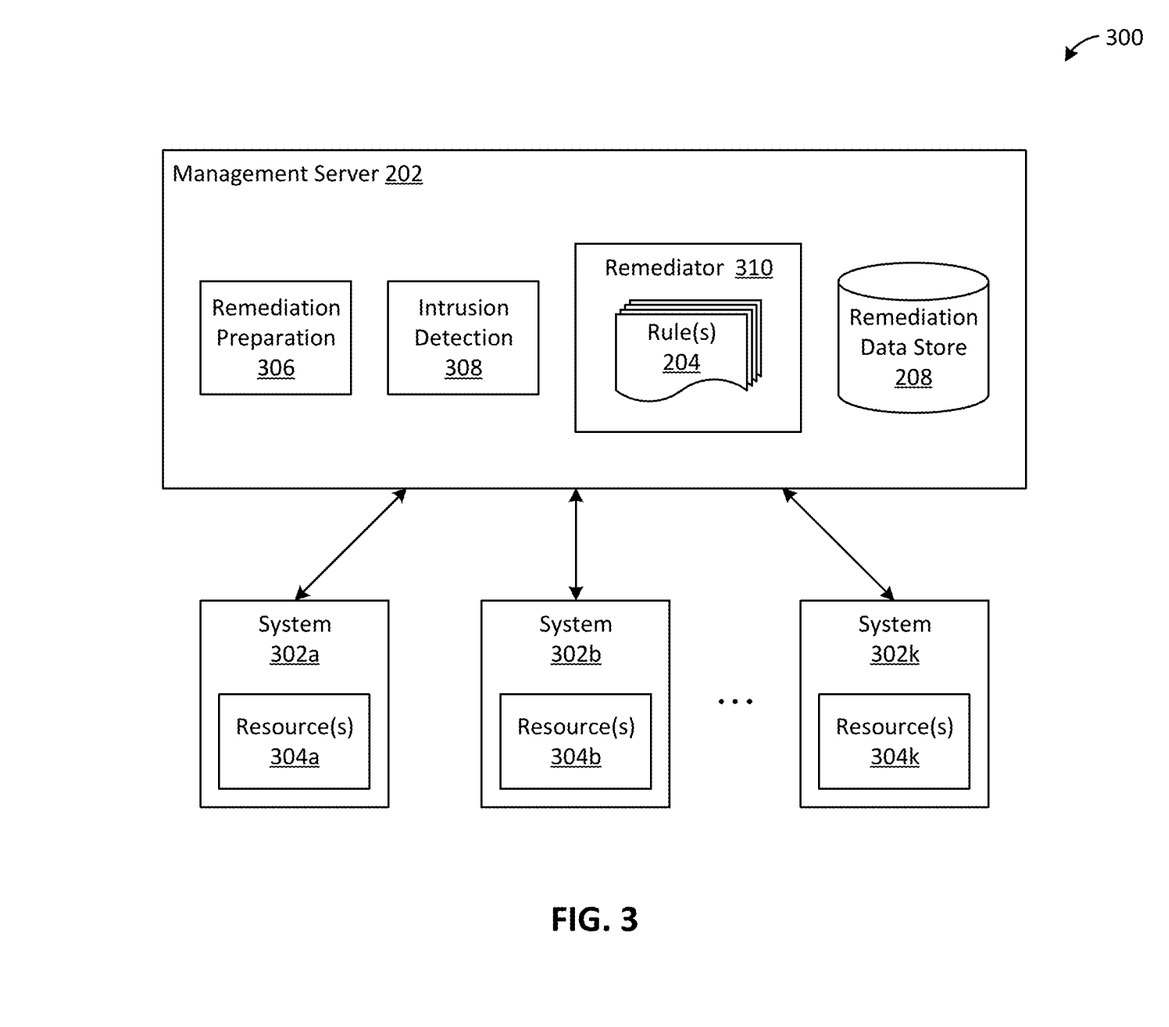
FIG. 3 is a block diagram of an illustrative system for intrusion detection and remediation, in accordance with an embodiment of the present disclosure.

Referring now to FIG. 3, shown is a block diagram of an illustrative system 300 for intrusion detection and remediation, in accordance with an embodiment of the present disclosure. In FIG. 3, elements of FIG. 2 are shown using like reference designators and, unless context dictates otherwise, may not be described again for purposes of clarity. Illustrative system 300 includes management server 202 and one or more systems 302a, 302b, . . . , 302k (302 generally) that, in turn, includes resource(s) 304a, 304b, . . . , 304k (304 generally), respectively. In brief, management server 202 may be monitoring resources 304 of systems 302 for intrusions (e.g., suspicious activities). Management server 202 and the individual systems 302 may be communicably coupled to one another via one or more communication networks (not shown). The communication networks can include, for example, the Internet, LANs, WANS, FC networks, etc.

In some embodiments, one or more of systems 302 may correspond to storage system 100 of FIG. 1. In such embodiments, management server 202 may correspond to management system 102 of FIG. 1. In other embodiments, management server 202 may be hosted on a physical and/or virtual machine or processing device that is separate from management system 102 of FIG. 1. In still other embodiments, management server 202 may be hosted on a physical and/or virtual machine or processing device that is separate from storage system 100 of FIG. 1. In some embodiments, management server 202 may be hosted on the node on which the monitored resources 304 are provided or hosted thereby (e.g., management server 202 may be hosted on system 302). In general, management server 202 may be hosted on a physical and/or virtual machine or processing device capable of providing communication (e.g., secure communication) and access to resources 304 that are being monitored.

As mentioned previously, management server 202 is operable to monitor resources of computing systems (e.g., resources 304 of systems 302) for intrusions. To this end, in the example of FIG. 3, management server 202 includes a remediation preparation module 306, an intrusion detection module 308, a remediator module 310, and remediation data store 208. Management server 202 can include other hardware and software resources such as those described herein with respect to computing device 500 of FIG. 5.

Remediation preparation module 306 is operable to prepare remediation materials for use in remediating intrusions on resources 304 of systems 302. In particular, according to one embodiment, remediation preparation module 306 can monitor for installation of resources 304 on systems 302. In response to detecting an installation of a particular resource 304 on a particular system 302, remediation preparation module 306 can prepare an initial full view of the newly installed resource 304 as the remediation materials for remediating intrusions on the particular resource 304. The full view of the newly installed resource 304 may include an original copy of resource 304 necessary to sanitize the particular resource 304 to its original state (e.g., state at the time of installation) and/or original copies of components of the particular resource 304 necessary to sanitize one or more components of the particular resource 304 to their original states (e.g., states at the time of installation). For example, for the particular resource 304, original copies of components can include original copies of the OS, application binaries, libraries, configuration files, etc. This list of components whose original copies can be prepared for use as remediation materials is merely illustrative and may vary depending on the particular resource.

In some embodiments, remediation preparation module 306 can save (e.g., record) the remediation materials for remediating intrusions on resources 304 within remediation data store 208, where they can subsequently be retrieved and used. For example, the remediation materials for remediating a resource (e.g., resource 304) can be retrieved from remediation data store 208 and used to sanitize the resource. In some embodiments, remediation data store 208 may be implemented or provided in a controlled environment. In some embodiments, remediation data store 208 may correspond to a storage service within the computing environment of management server 202.

Intrusion detection module 308 is operable to monitor resources 304 of systems 302 for intrusions. In some embodiments, intrusion detection module 308 can implement or utilize an intrusion detection technique, such as the intrusion detection techniques provided by the AIDE or another open source integrity checking utility, to monitor resources 304 for intrusions. If an intrusion on a resource (e.g., suspicious activity on resource 304) is detected, intrusion detection module 308 can send a notification to remediator module 310 informing (e.g., notifying) of the detected intrusion on the resource. The notification of the detected intrusion may include information about the resource that is intruded on and the level of intrusion (e.g., the degree of intrusion), such as, for example, a single file, multiple files, a single node, multiple nodes, etc., that was detected.

Remediator module 310 is operable to remediate intrusions on resources 304 of systems 302. To this end, remediator module 310 can leverage rules 204 to remediate intrusions on resources 304. As described previously, rules 204 define conditions and actions for remediating illegitimate intrusions on resources (e.g., resources 304). Remediator module 310 can orchestrate the running of the rules to remediate the intrusions on the resources. In some embodiments, in response to a notification informing of a detected intrusion on a resource (e.g., a particular resource 304), remediator module 310 can determine whether the intrusion on the resource is an illegitimate intrusion. To determine whether the intrusion is an illegitimate intrusion, according to one embodiment, remediator module 310 can identify a rule (e.g., one of rules 204) that is configured for determining whether the intrusion on the resource is an illegitimate intrusion and run the identified rule. If the determination based on the running the rule is that the intrusion of the resource is not an illegitimate intrusion, remediator module 310 does not perform any operations to remediate the intrusion on the resource. In this case, remediator module 310 does not perform any remediation since the detected intrusion on the resource is expected and not deemed to be malicious, for example.

However, if the determination based on the running the rule is that the intrusion of the resource is an illegitimate intrusion, remediator module 310 can remediate the intrusion on the resource. To remediate the intrusion on the resource, according to one embodiment, remediator module 310 can identify the rule(s) (e.g., one or more of rules 204) that are configured for remediating the intrusion on the resource and run the rule(s) to remediate the intrusion on the particular resource. As a result, the actions defined by the rule(s) are executed to sanitize the intruded-on resource and remediate the intrusion. In some embodiments, based on the actions defined by the rule(s), the sanitization may extend beyond the resource that is intruded on (e.g., the actions defined by the rule(s) configured to remediate the intrusion on the resource may sanitize beyond the resource).

In some embodiments, the remediation of the intrusion on the resource may be performed in a manner that is non-destructive (e.g., transparent) to any connected client. For example, a client may have established a connection to a system/service on which an intrusion on a resource is detected. In this case, remediation module 310 can remediate the intrusion on the resource so as to not cause the connected client to time out because of the remediation that is being performed. That is, the intrusion on the resource is remediated and the system/service is brought back to a normal running state before the connected client times out and fails the connection. As a result, the system/service provides HA characteristics to its clients.

Figure 4:
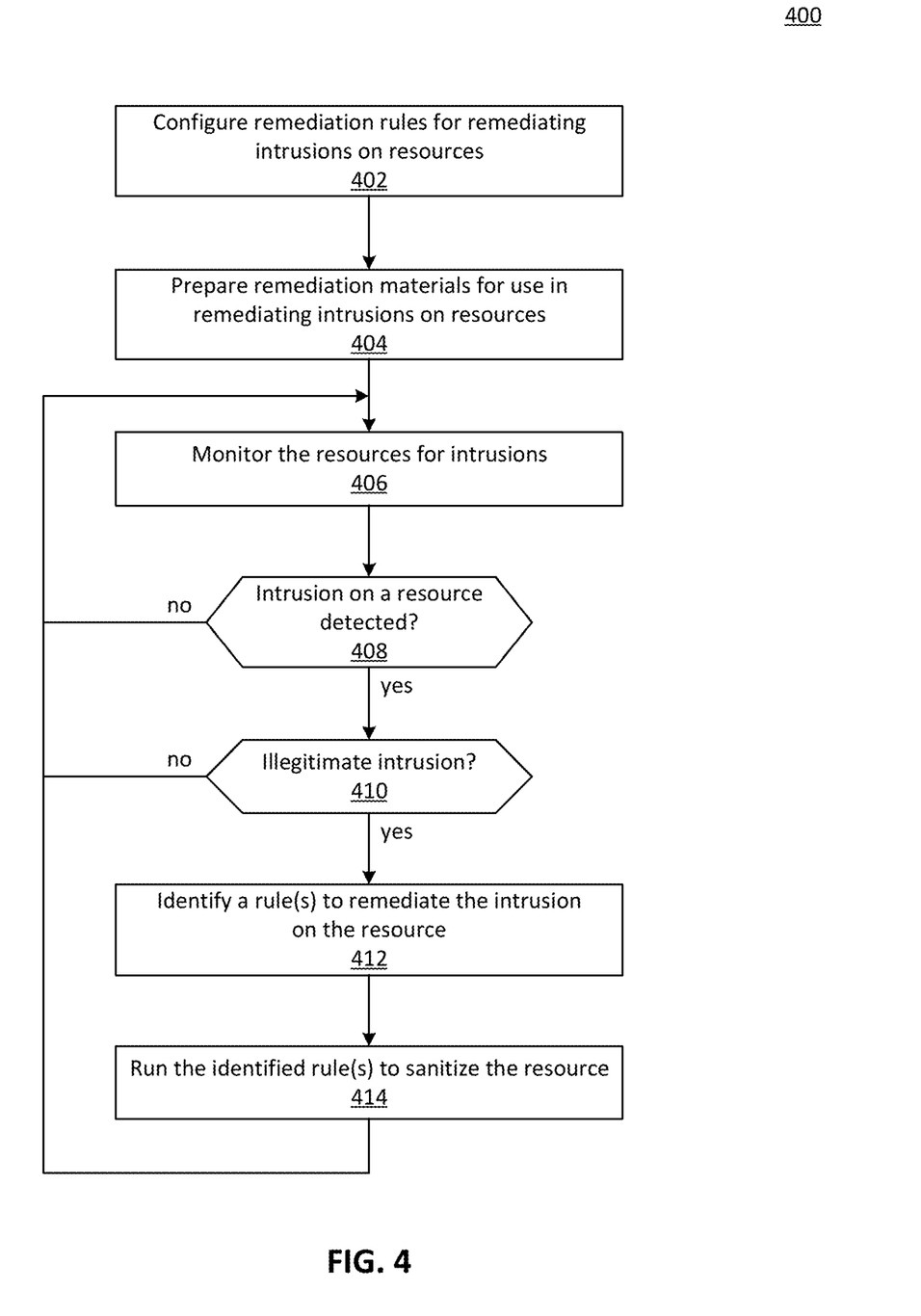
FIG. 4 is a flow diagram of an example process for intrusion detection and remediation, in accordance with an embodiment of the present disclosure.

FIG. 4 is a flow diagram of an example process 400 for intrusion detection and remediation, in accordance with an embodiment of the present disclosure. Illustrative process 400 may be implemented, for example, within system 300 of FIG. 3. In more detail, process 400 may be performed, for example, in whole or in part by remediation preparation module 306, intrusion detection module 308, and remediator module 310, or any combination of these and other components of system 300 described with respect to FIG. 3.

With reference to process 400 of FIG. 4, at 402, remediation rules for remediating intrusions on resources may be configured. For purposes of discussion, a user having sufficient knowledge of the functionality of the underlying systems/services on which the resources are provided or hosted thereby may configure the remediation rules. Rules to determine whether intrusions on resources are illegitimate intrusions as well as rules that define actions that are to be performed to remediate intrusions on the resources may be configured.

At 404, remediation materials for use in remediating intrusions on the resources may be prepared. For example, for a particular resource that is to be monitored, the remediation materials needed to remediate an intrusion on the resource may be determined and prepared when the resource is first installed on the system/service. In some embodiments, the remediation materials may be prepared and/or saved in a controlled environment.

At 406, the resources may be monitored for intrusions. For example, intrusion detection techniques (e.g., the AIDE) may be utilized to monitor the resources on the systems/services for intrusions.

If no intrusion on a resource being monitored is detected at 408, the monitoring of the resources may continue at 406. If, at 408, an intrusion on a resource is detected, then, at 410, a check to determine whether the intrusion on the resource is an illegitimate intrusion may be performed. For example, the determination of whether an intrusion is an illegitimate intrusion may be based on the state of the underlying system/service of the resource. The rule configured to determine whether the intrusion on the resource is illegitimate may be identified and run (e.g., the condition defined in the rule evaluated) to determine whether the intrusion on the resource is an illegitimate intrusion. If it is determined that the intrusion on the resource is not an illegitimate intrusion, then, at 406, the monitoring of the resources may continue.

Otherwise, if, at 410, it is determined that the intrusion on the resource is an illegitimate intrusion, then, at 412, one or more rules (e.g., at least one rule) that are configured for remediating the intrusion on the resource may be identified. At 414, the rules identified at 412 may be run to sanitize the resource and remediate the intrusion. For example, sanitizing the resource may return the resource to its original state. Upon running the rules, the monitoring of the resources may continue at 406.

FIG. 5 is a block diagram illustrating selective components of an example computing device 500 in which various aspects of the disclosure may be implemented, in accordance with an embodiment of the present disclosure. For example, illustrative computing device 500 can perform all or part of the processes described herein. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described with reference to FIGS. 1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUS), microcontrollers, field programmable gate arrays (FPGAs), programmable logic arrays (PLAs), multi-core processors, or general-purpose computers with associated memory.

Processor 502 may be analog, digital, or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   detecting, by a computing device, installation of a resource of a computing system;
   preparing, by the computing device in response to detecting the installation of the resource, remediation materials for use in remediating an intrusion on the resource;
   monitoring, by the computing device, the resource for intrusions;
   detecting, by the computing device, an intrusion on the resource based on the monitoring;
   determining, by the computing device based on a first one or more rules, whether the intrusion is a legitimate intrusion or an illegitimate intrusion; and
   responsive to determining that the intrusion on the resource is an illegitimate intrusion, by the computing device:
     identifying a second one or more rules to execute to remediate the intrusion on the resource; and
     running the identified second one or more rules to remediate the intrusion on the resource, wherein the second one or more rules define one or more actions to sanitize the resource based on the remediation materials.

2. The method of claim 1, wherein the remediation materials include an original copy of the resource necessary to sanitize the resource to its original state.

3. The method of claim 1, wherein the remediation materials include original copies of components of the resource necessary to sanitize a component of the resource to its original state.

4. The method of claim 1, wherein the preparing of the remediation materials is in a controlled environment.

5. The method of claim 1, wherein the second one or more rules define one or more actions to sanitize one or more additional resources.

6. The method of claim 1, wherein the resource is an operating system (OS)-level component, and wherein the second one or more rules define one or more actions to sanitize all or a subset of OS-level components of the computing system.

7. The method of claim 1, wherein the resource is an application-level component, and wherein the second one or more rules define one or more actions to sanitize all or a subset of application-level components of the computing system.

8. The method of claim 1, wherein the resource is a storage-level component, and wherein the second one or more rules define one or more actions to sanitize all or a subset of storage-level components of the computing system.

9. The method of claim 1, wherein the resource is a network-level component, and wherein the second one or more rules define one or more actions to sanitize all or a subset of network-level components of the computing system.

10. The method of claim 1, wherein the resource is a node in a cluster, and wherein the second one or more rules define one or more actions to sanitize all or a subset of nodes in the cluster.

11. A computing device comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
detecting installation of a resource of a computing system;
preparing remediation materials for use in remediating an intrusion on resource in response to detecting the installation of the resource;
monitoring the resource for intrusions;
detecting an intrusion on the resource based on the monitoring;
determining, based on a first one or more rules, whether the intrusion is a legitimate intrusion or an illegitimate intrusion; and
responsive to determining that the intrusion on the resource is an illegitimate intrusion, running a second one or more rules to remediate the intrusion on the resource, wherein the second one or more rules define one or more actions to sanitize the resource based on the remediation materials.

12. The computing device of claim 11, wherein the remediation materials include an original copy of the resource necessary to sanitize the resource to its original state.

13. The computing device of claim 11, wherein the remediation materials include original copies of components of the resource necessary to sanitize a component of the resource to its original state.

14. The computing device of claim 11, wherein the preparing of the remediation materials is in a controlled environment.

15. The computing device of claim 11, wherein the second one or more rules define one or more actions to sanitize one or more additional resources.

16. The computing device of claim 11, wherein the resource is a configuration file of a service, and wherein the second one or more rules define one or more actions to sanitize the service.

17. The computing device of claim 11, wherein the second one or more rules define one or more actions to sanitize all or a subset of components of the computing system that are of a same type as the resource.

18. A non-transitory machine-readable medium encoding instructions that when executed by one or more processors cause a process to be carried out, the process including:
detecting installation of a resource of a computing system;
preparing remediation materials for use in remediating an intrusion on the resource in response to detecting the installation of the resource;
monitoring the resource for intrusions;
detecting an intrusion on the resource based on the monitoring;
determining, based on a first one or more rules, whether the intrusion is a legitimate intrusion or an illegitimate intrusion; and
responsive to determining that the intrusion on the resource is an illegitimate intrusion, running a second one or more rules to remediate the intrusion on the resource, wherein the second one or more rules define one or more actions to sanitize the resource based on the remediation materials.

19. The non-transitory machine-readable medium of claim 18, wherein the remediation materials include one of an original copy of the resource necessary to sanitize the resource to its original state or original copies of components of the resource necessary to sanitize a component of the resource to its original state.

20. The non-transitory machine-readable medium of claim 18, wherein the preparing of the remediation materials is in a controlled environment.

* * * * *